July 10, 1956 W. L. GREENE 2,753,684
THRUST REVERSAL AND VARIABLE ORIFICE FOR JET ENGINES
Filed June 2, 1953 3 Sheets-Sheet 2

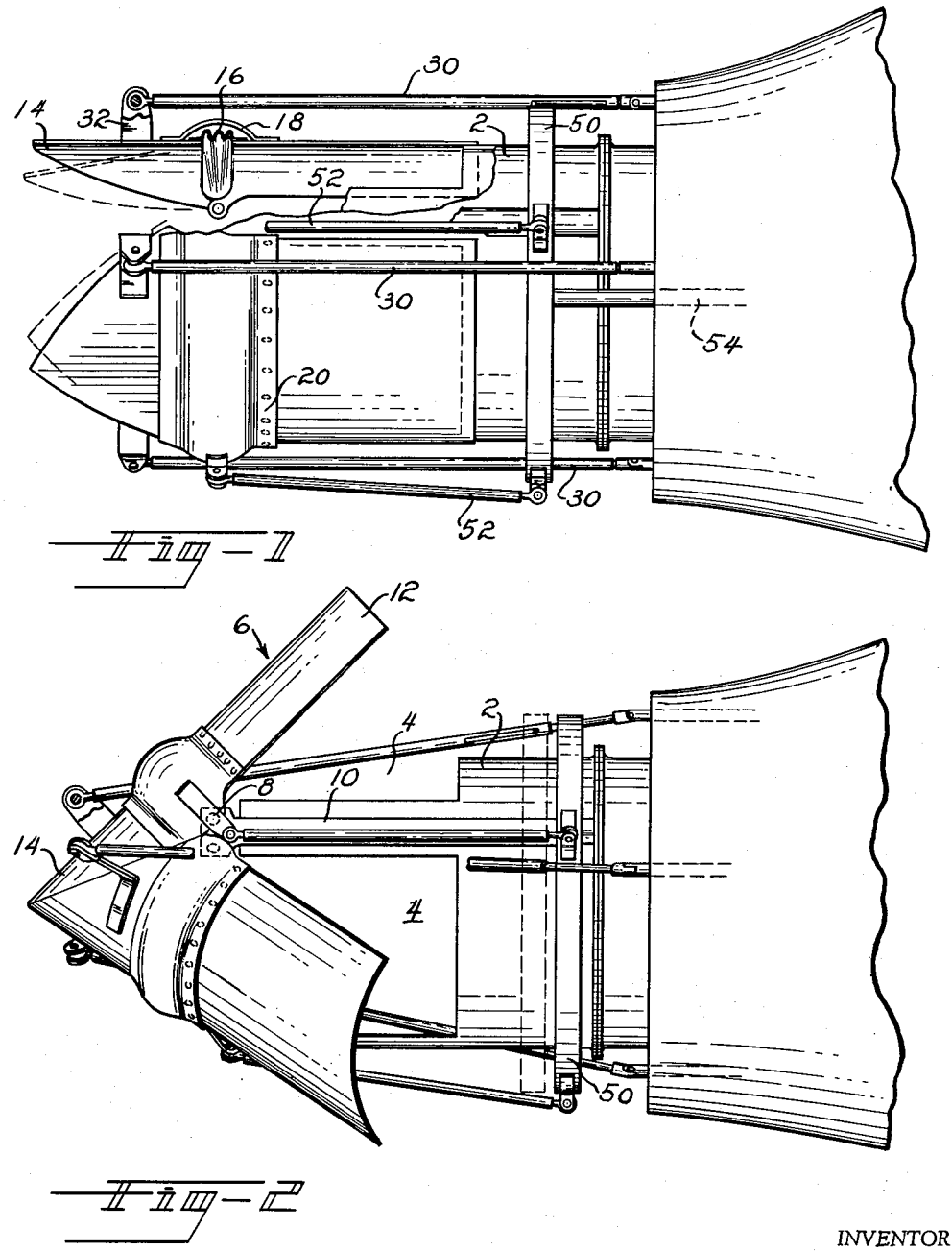

INVENTOR
WILLIAM L. GREENE

BY *Scrivener + Parker*

ATTORNEYS

July 10, 1956 W. L. GREENE 2,753,684
THRUST REVERSAL AND VARIABLE ORIFICE FOR JET ENGINES
Filed June 2, 1953 3 Sheets-Sheet 3
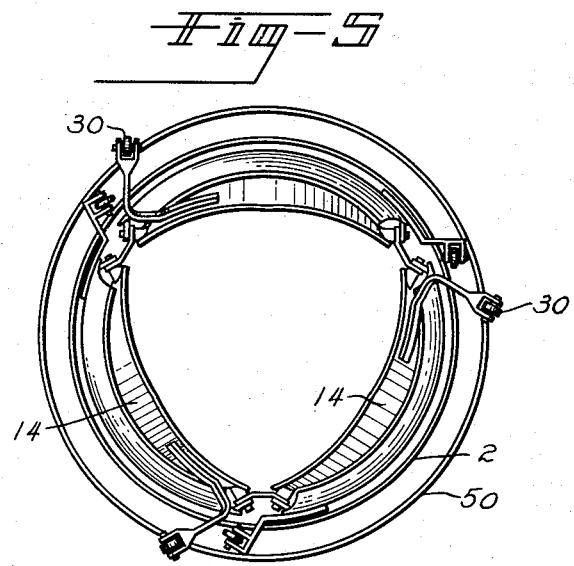
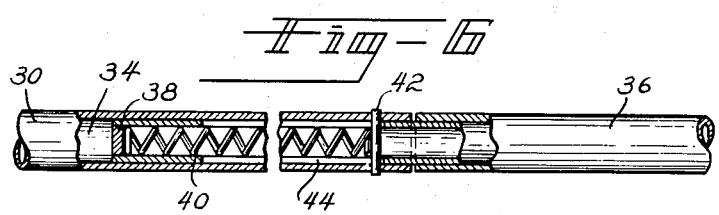
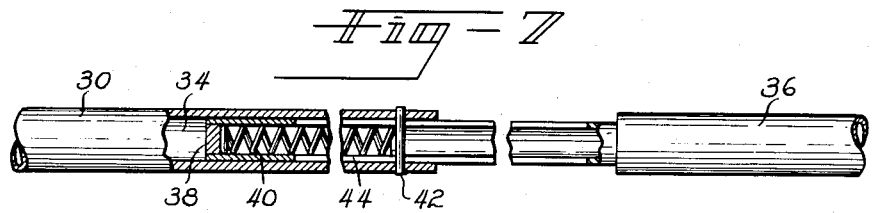
INVENTOR
WILLIAM L. GREENE
BY Scrivener & Parker
ATTORNEYS 2,753,684
Patented July 10, 1956

2,753,684

THRUST REVERSAL AND VARIABLE ORIFICE FOR JET ENGINES

William L. Greene, Colesville, Md., assignor, by mesne assignments, to ACF Industries, Incorporated, a corporation of New Jersey Application June 2, 1953, Serial No. 359,157

1 Claim. (Cl. 60—35.6)

This invention relates broadly to the propulsion of aircraft by means of the reaction of rearwardly-discharged gases, such as is accomplished by jet engines and rockets and, more particularly, has to do with the nozzle or tail-pipe through and from which the gases are discharged. Although not limited to use with turbo-jet engines the invention will be described in this application in connection with such an engine.

In jet engine design and operation it has been established that the jet orifice should vary in size with various operating conditions in order to achieve maximum efficiency and performance under such varied conditions. For example, in one type of jet engine to which this invention may be usefully applied air is taken into the inlet end of the engine duct, compressed, passed into combustion chambers, thence to a turbine which drives the compressor and, from there, passes through the tail-pipe to be discharged rearwardly of the aircraft to produce the forward propulsive effort. In some engines now being used additional propulsive effort for take-off, climbing and high-speed maneuvering is secured by burning additional fuel on the delivery side of the turbine to raise the temperature of the advancing gas. It has been found that when such a socalled "after-burner" is used, efficiency considerations require that the area of the passage through the tail-pipe be greater than its area under normal cruising conditions when the after-burner is not in use. It has therefore become desirable that means be provided for varying the area of the tail-pipe passage and a number of constructions and arrangements have been proposed for accomplishing this end.

It will be apparent that the reduction of the area of the tail-pipe is never continued to complete shut-off if the reduction is being accomplished only for the reasons set forth above. However, complete shut-off and reversal of direction of the discharged gases are of great utility under certain operating conditions. The most important use of thrust reversal in the operation of jet aircraft is to provide braking action both in the air and on the ground, but other uses are also of great utility. For example, it is well-known that if a jet engine is throttled down to reduce the jet thrust and is then run up to high speed, some time will elapse before the jet produces full thrust. This is a source of danger in such operations as landing, in which it may be necessary to go very quickly from the low thrust requirement of the usual landing operation to the very high thrust requirement of recovery from a bad landing and quick gain of altitude. This difficulty is overcome by the provision of thrust-reversing means, which permit full power of the engine to be maintained at all times, while the thrust effect of the jet is varied to full reversal by operation of the thrust reversing means.

It has been the principal object of my invention to provide means which are selectively operable either to vary the size of the jet orifice in order to produce maximum jet efficiency under varied operating conditions or to entirely or substantially close the jet orifice and direct the discharged gases in a direction substantially opposite to that in which they normally are discharged, thus spoiling the normal thrust.

The object has been achieved according to the present invention by the provision of vanes which normally form the rear end of the tail pipe and which have parts which may be moved toward each other in the direction of the axis of the tail pipe to vary the area of the discharge orifice thereof, and which may also be moved, each as to a whole, to successive positions in which they progressively close the discharge orifice and present to the discharged gases surfaces which deflect all or part of the gases outwardly from the tail pipe in a direction substantially opposite to that in which the gases normally are discharged through the discharge orifice. In the operation of the vanes as a thrust-spoiler the closure of the vanes may be continued to full shut-off and the forward ends of the vanes are caused to move outside of the tail-pipe, thus causing the gases which impinge on the vanes to be reversed in direction by the vanes and discharged in the direction of movement of the aircraft. As the vanes may be quickly moved between closed and open positions they may be closed for maneuvers requiring low thrust, such as landings, and quickly opened to give partial or maximum thrust if this is required, all without throttling down the engine.

A single embodiment of my invention is described in the following specification and illustrated in the annexed drawings, it being understood that this embodiment is only illustrative of the invention and imposes no limits thereon not imposed by the appended claim.

In the drawings forming part of this application,

Fig. 1 is a side elevational view of the tail-pipe of a jet propelled aircraft, showing the nozzle-restricting and thrust reversing means according to this invention, with the vanes in open position in full lines and in nozzle-restricting position in broken lines;

Fig. 2 shows the tail-pipe of Fig. 1 with the vanes in thrust-reversing position;

Fig. 5 is an end view showing the vanes in nozzle-restricting position, and

Figs. 6 and 7 show details of the vane operating rods in different positions.

Figure 3:
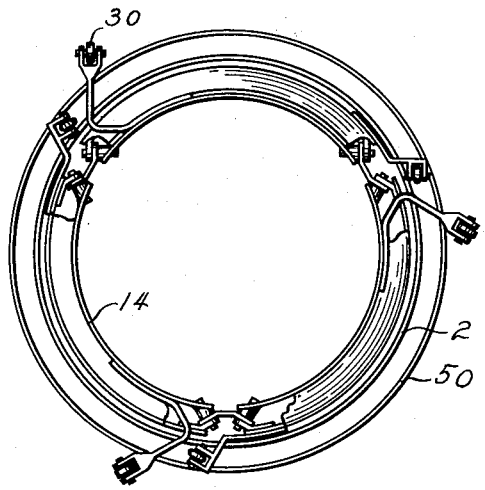
Fig. 3 is an end view of the vanes in the full-line position of Fig. 1.
Figure 4:
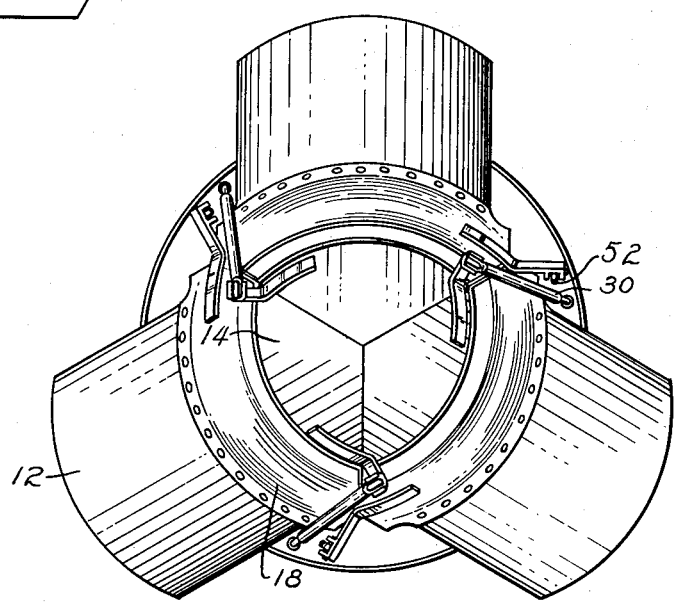
Fig. 4 is an end view of the vanes in the position shown in Fig. 2.

In accordance with my invention I modify the tail pipe 2 of a jet engine or jet propelled aircraft by providing at the rear end thereof a plurality of circumferentially spaced openings 4, there being three shown in the disclosed embodiment of the invention. A vane 6 is associated with each opening and is pivotally mounted adjacent, or to the rear of, the rear end of the tail pipe as shown at 8. Brackets 10 may be mounted on the tail pipe between adjacent openings 4 to provide the pivotal supports for the vanes. Each vane comprises a forward part 12 and a rearward part 14 which are mounted for pivotal movement with respect to each other on the pivotal supports 8. The forward part 12 of each vane is arcuate in cross-section and is of such longitudinal and circumferential dimensions as to completely close the tail pipe opening with which it is associated when in closed or normal position. In such normal position of the vane, which is shown in full lines in Fig. 1, the forward part 12 of the vane completely covers the opening with which it is associated and in this position of the vanes they form the most rearward part of the tail pipe and close all of the openings 4. The rearward part 14 of each vane is arcuate in cross-section and in the normal position of the vanes which is shown in full lines in Fig. 1 form rearward extensions of the forward parts 12 of the vanes. These rearward parts 14 are tapered rearwardly to a point, in such a way that when the vanes are moved as a unit to thrust-reversing position as shown in Fig. 2 the rearward parts fit together to form a cone which completely blocks the discharge of gases from the orifice at the rear end of the tail pipe. The space between the forward and rearward parts of all of the vanes is closed by an annular corrugated, flexible shroud 16 which extends throughout the entire circumference of the assembly and is attached at its side edges to the forward and rearward parts of the vane. A housing 18 of arcuate cross-section is provided for each vane and surrounds and covers the shroud 16 and is attached only to the forward part 12 of the vane as shown at 20, in order to permit the two parts of each vane to move with respect to each other. The shrouds 16 and housing 18 provide means for preventing the escape of gases between the forward and rearward parts of the vanes.

Means are provided by the invention for moving the rearward parts 14 of the vanes inwardly of the tail pipe to restrict or vary the area thereof without moving the forward parts of the vanes from their normal positions in which they cover the openings 4 in the tail pipe and form part thereof. Such means comprise rods 30, which extend longitudinally of the tail pipe and each of which is connected at its rearward end to a bracket 32 which is mounted on the rear portion 14 of one of the vanes. The forward end of each rod 30 is hollow as shown at 34 to receive the reduced end of a hollow rod 36 which forms an extension of rod 30. The end of each rod 36 within rod 30 is closed as shown at 38 and a compression spring 40 is disposed within rod 36 and bears at its one end against the closure member 38. The other spring end seats against a pin 42 which extends diametrically across rods 30 and 36 and is attached to rod 30 adjacent the forward end thereof so that as the rods 36 are moved rearwardly the pins 42 are contacted conjointly moving the rods 30 to tilt vanes 14 inwardly. Rod 36 is slotted rearwardly of pin 42 as shown at 44 in order to permit the two rods to move with respect to each other with consequent compression of spring 40 between abutment 38 and pin 42 to provide lost motion when the vane parts are moved simultaneously as described in detail below.

When it is desired to move the rearward vane parts 14 inwardly of the tail pipe to restrict or vary the area of the tail pipe orifice, rod 36 is operated rearwardly by any suitable means, which are not shown, and in so doing moves rod 30 rearwardly causing each of the rear vane parts 14 to move about its pivotal connection to the forward vane part to a position inward of its normal position. Such nozzle-restricting positions of the rear vane parts are shown in dotted lines in Fig. 1 and in full lines in Fig. 5.

Means are also provided by the invention for moving each of the vanes as a unit to a position in which the tapered rear ends of all of the vanes come together to form a cone which substantially blocks the discharge of gases from the rear orifice of the tail pipe, and in which position the forward end parts 12 of the vanes are moved away from the tail pipe openings 4 to inclined positions outwardly of the tail pipe and aligned with the rear parts 14 of the vanes, whereby the two parts of the vanes provide surfaces which force the discharged gases outwardly through the tail pipe openings 4 and deflect them in a substantially forward direction to reverse the thrust of the discharged gases. Such means comprise a ring 50 which surrounds the tail pipe at a position forward of the vanes and which is connected by rearwardly extending rods 52 to the exterior of housing 18. One of these rods 52 connects the ring 50 to housing 18 associated with each vane and in the disclosed embodiment three such rods are provided. Operating means, including a rod 54 which is connected to ring 50, are provided for moving the ring 50 longitudinally of the tail pipe.

When it is desired to reverse the thrust of the discharge gases the rod 54 is operated to move the ring 50 rearwardly, thus pushing the rods 52 rearwardly and turning all of the vanes about the pivotal supports 8 in such a way that the rearward parts 14 come together rearwardly of the rear end of the tail pipe, forming a closed cone, while the forward parts 12 of the vanes move outwardly from the tail pipe openings 4 to inclined positions in alignment with the rear parts 14. In this position the two parts of each vane provide an arcuate surface which deflects the rearwardly discharged gases outwardly from the tail pipe through openings 4 in a direction substantially opposite to their normal direction of discharge.

It is believed that the foregoing description will constitute a full disclosure of the invention to those skilled in the art. It is recognized that other embodiments of the invention, as well as modifications of those disclosed, may be made without departing in any way from the spirit or scope of the invention, for the limits of which reference must be made to the appended claim.

What is claimed is:

A jet propulsion unit comprising a tail-pipe having a plurality of circumferentially-spaced openings adjacent the rear end thereof, a plurality of vanes pivotally mounted on the tail-pipe adjacent said openings, each vane having a forward part normally closing the opening and forming part of the tail-pipe and a laterally tapered rear part pivotally connected to the first part to extend rearwardly therefrom and forming an extension of the rear end of the tail-pipe, control means for simultaneously moving the rear parts of all of the vanes with respect to the forward parts in directions inwardly to restrict the effective area of the discharge orifice of the tail-pipe, an annular shroud coaxially disposed with respect to the tail-pipe within said housings with its opposite ends attached to the adjacent edges of the two parts of the respective vanes to close the opening therebetween, said shroud being of corrugated, flexible material to permit relative pivotal movement between the two parts of the vanes, and further control means including a plurality of arcuate housings each connected to one part of a corresponding vane and extending over the shroud to engage the other part of the vane for simultaneously moving all of the vanes, each as a unit, to positions inclined with respect to the tail-pipe wherein the tapered rear parts of the vanes form a cone rearward of the tail-pipe orifice with the forward parts of the vanes in alignment with the rear parts thereof in positions outwardly of the tail-pipe thereby uncovering the openings therein.

References Cited in the file of this patent

UNITED STATES PATENTS

| | | |
|---|---|---|
| 1,798,141 | Chillingworth | Mar. 31, 1931 |
| 2,551,372 | Haltenberger | May 1, 1951 |
| 2,620,622 | Lundberg | Dec. 9, 1952 |
| 2,640,317 | Fentress | June 2, 1953 |
| 2,680,948 | Greene | June 15, 1954 |